United States Patent [19]
Ohtagaki et al.

[11] Patent Number: 5,257,672
[45] Date of Patent: Nov. 2, 1993

[54] REAR DIFFERENTIAL GEAR LOCK CONTROLLER INCLUDING DIAGNOSTIC SYSTEM FOR DETERMINING VEHICLE SPEED SENSOR FAILURE

[75] Inventors: Shigeki Ohtagaki; Hirosi Watanabe, both of Hyogo, Japan

[73] Assignee: Mitsubishi Denki K.K., Tokyo, Japan

[21] Appl. No.: 936,212

[22] Filed: Aug. 27, 1992

[30] Foreign Application Priority Data

Aug. 27, 1991 [JP] Japan .................... 3-215000

[51] Int. Cl.⁵ ........................................ B60K 17/35
[52] U.S. Cl. ............................. 180/249; 180/248
[58] Field of Search .......... 180/247, 248, 249, 250; 74/866; 475/231; 364/424.03

[56] References Cited

U.S. PATENT DOCUMENTS

| | | | |
|---|---|---|---|
| 4,700,797 | 10/1987 | Leiber | 180/249 X |
| 4,947,325 | 8/1990 | Iwata et al. | 180/249 X |
| 5,125,490 | 6/1992 | Suzumura et al. | 180/249 X |

FOREIGN PATENT DOCUMENTS

| | | | |
|---|---|---|---|
| 0018330 | 1/1987 | Japan | 180/249 |
| 0110530 | 5/1987 | Japan | 180/248 |
| 63-154323 | 10/1988 | Japan | . |

*Primary Examiner*—Margaret A. Focarino
*Assistant Examiner*—Peter English
*Attorney, Agent, or Firm*—Sughrue, Mion, Zinn, Macpeak & Seas

[57] ABSTRACT

A differential gear lock controller, in which it is judged that a speed sensor has failed if the throttle opening or the number of revolutions of an engine is greater than or equal to a predetermined value and if the state in which the vehicle speed is zero elapses a predetermined time or more, or if the deceleration of the vehicle speed is greater than or equal to a predetermined value. In such a case, the operation of controlling a driver for driving a mechanism for locking a rear differential gear is stopped.

5 Claims, 2 Drawing Sheets

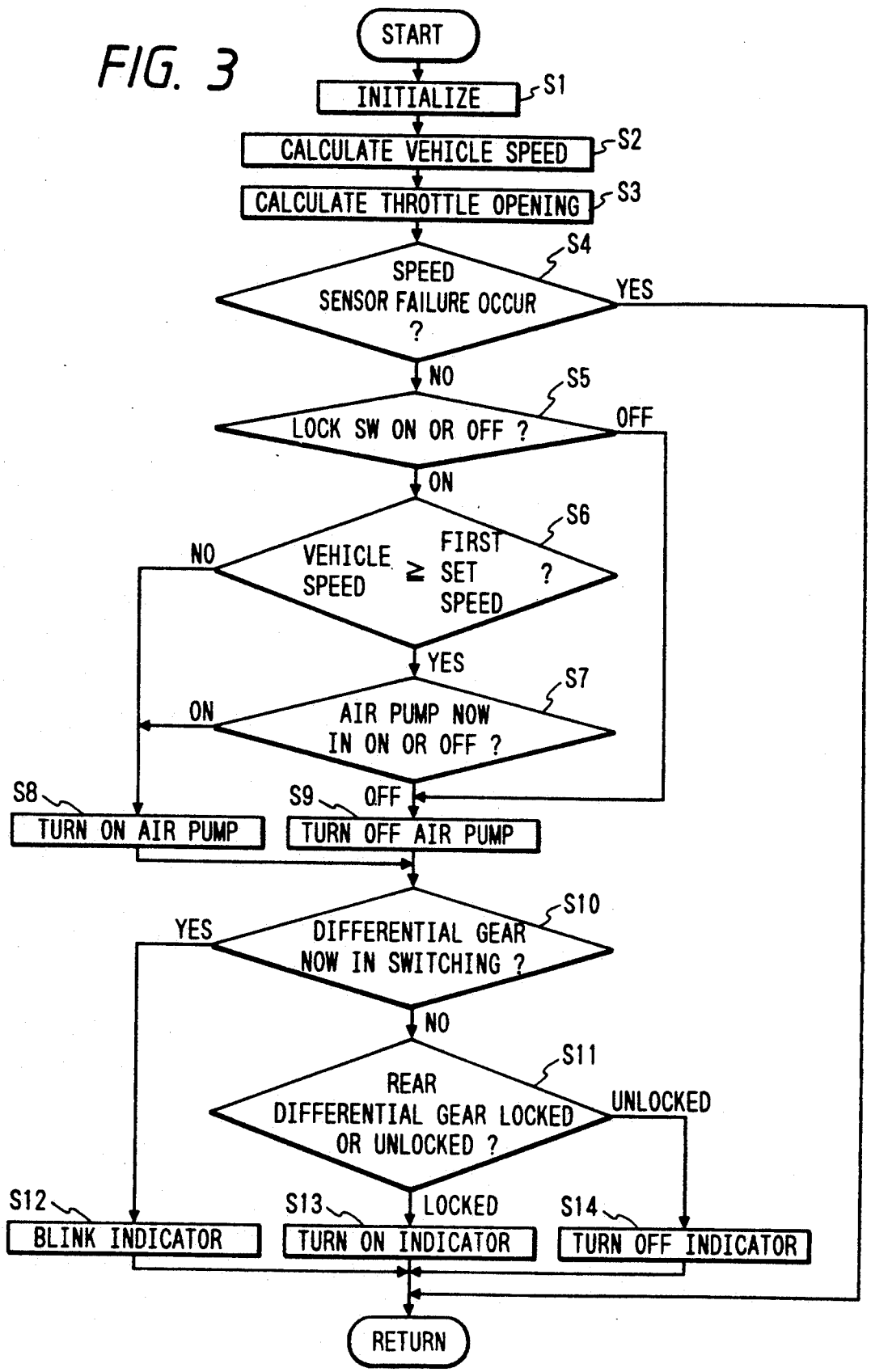

REAR DIFFERENTIAL GEAR LOCK CONTROLLER INCLUDING DIAGNOSTIC SYSTEM FOR DETERMINING VEHICLE SPEED SENSOR FAILURE

BACKGROUND OF THE INVENTION

The invention relates to a rear differential gear lock controller of a vehicle.

A conventional rear differential gear lock controller is known which allows a rear differential gear to be locked by a differential gear lock switch at speeds less than a set vehicle speed and prohibits the rear differential gear from being locked at speeds greater than or equal to the set vehicle speed. However, this type of conventional controller encounters breakage and failure of a speed sensor. Once the speed sensor detects no speed pulse (hereinafter referred to as "speed sensor failure" where applicable), the speed sensor erroneously judges that the vehicle is running at speeds less than the set vehicle speed even if the vehicle is running at speeds greater than or equal to the set vehicle speed. As a result, the rear differential gear is allowed to be locked by the differential gear lock switch.

As described above, the conventional rear differential gear lock controller erroneously judges, upon occurrence of a speed sensor failure, that the vehicle is running at speeds less than the set speed when making a turn even if the vehicle is actually running at speeds greater than or equal to the set speed. As a result, the differential gear lock switch has been turned on, and the rear differential gear is locked, hence causing problems, such as damaging the rear differential gear lock mechanism or causing a sharp under-steering due to the locking of the rear differential gear.

SUMMARY OF THE INVENTION

The invention has been made to overcome the above-mentioned problems. Accordingly, the object of the invention is to provide a safer rear differential gear lock controller having a speed sensor fail-safe function.

The invention is applied to a rear differential gear lock controller which includes a failure judging unit and a control unit. The failure judging unit judges that a speed sensor has failed. The control means allows the rear differential gear to be locked at speeds less than a predetermined vehicle speed, prohibits the rear differential gear from being locked at speeds greater than or equal to the predetermined vehicle speed, and stops the operation of controlling a drive unit when the speed sensor has failed.

The invention allows the rear differential gear to be locked at speeds less than a predetermined vehicle speed, prohibits the rear differential gear from being locked at speeds greater than or equal to the predetermined vehicle speed, and stops the control of locking the rear differential gear when the speed sensor has failed.

BRIEF DESCRIPTION OF THE DRAWINGS

FIG. 3 is a flowchart showing an operation of the apparatus of the invention.

DESCRIPTION OF PREFERRED EMBODIMENT

Figure 1:
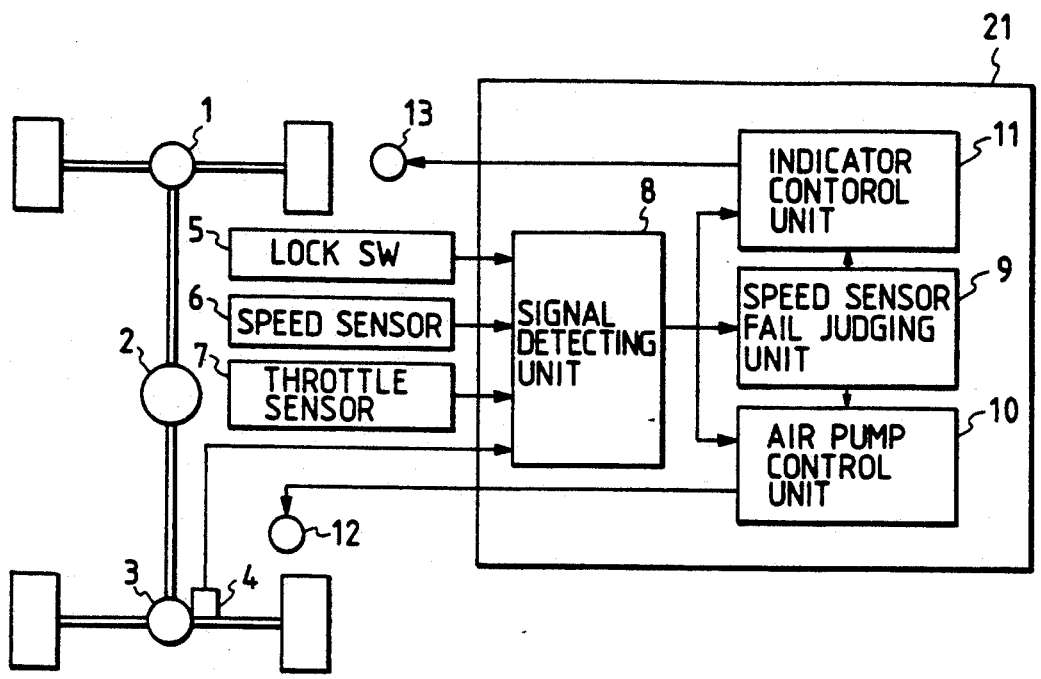
FIG. 1 is a diagram showing a configuration of an apparatus of the invention.

An embodiment of the invention will hereunder be described with reference to the drawings. FIG. 1 shows a configuration of a rear differential gear lock controller, which is the embodiment of the invention. Reference numeral 1 designates a front differential gear; 2, a center differential gear; 3, a rear differential gear; 4, a lock detecting switch for detecting the locked state of the rear differential gear 3; 5, a differential gear lock switch for issuing an instruction for locking the rear differential gear 3; 6, a speed sensor for detecting a vehicle speed; 7, a throttle opening sensor for detecting the opening of the throttle of an engine; 12, an air pump that produces air pressure for driving a mechanism for locking the rear differential gear 3; and 13, an indicator that indicates the locked state of the rear differential gear 3.

Figure 2:
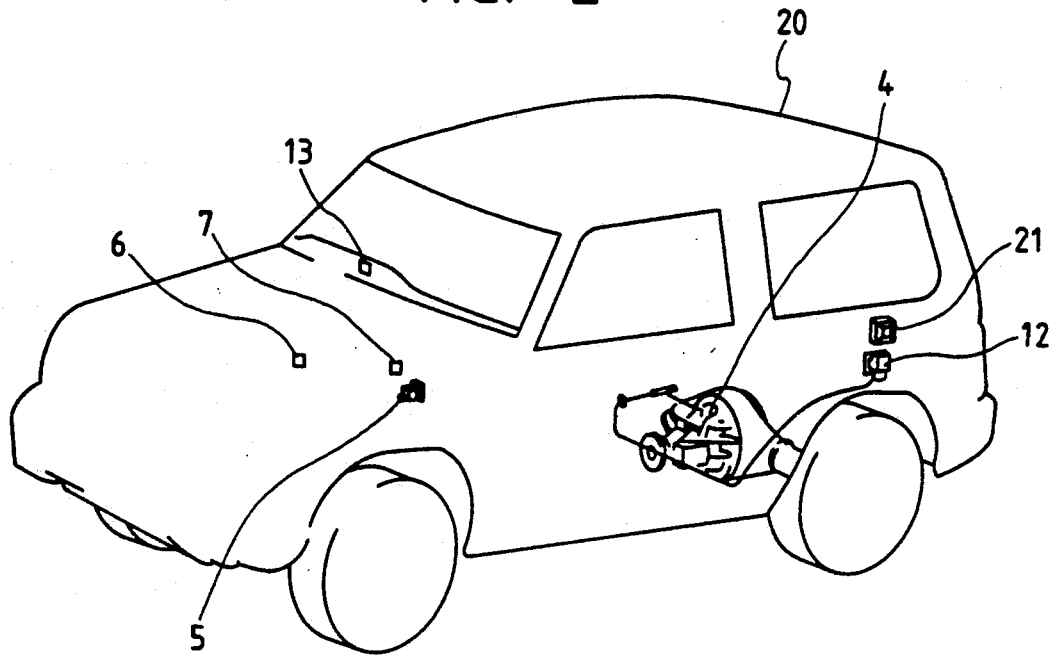
FIG. 2 is a perspective view showing a vehicle body mounting the apparatus of the invention thereon.

Reference numeral 21 designates a control section, including a signal detecting unit 8, a speed sensor failure judging unit 9, an air pump control unit 10, and an indicator control unit 11. The signal detecting unit 8 not only judges that the operation for locking the rear differential gear 3 has been instructed by an input from the differential gear lock switch 5, but also judges the locked state of the rear differential gear 3 according to inputs from the differential gear lock switch 5 and the lock detecting switch 4, and calculates the vehicle speed and the throttle opening according to inputs from the speed sensor 6 and the throttle opening sensor 7. The speed sensor failure judging unit 9 judges that the speed sensor 6 has failed based on an output of the signal detecting unit 8. The air pump control unit 10 controls the air pump 12 based on outputs of the speed sensor failure judging unit 9 and the signal detecting unit 8. The indicator control unit 11 controls the indicator 13. FIG. 2 is a perspective view of a vehicle body 20 on which the respective components shown in FIG. 1 are mounted.

An operation of the control section 21 will be described with reference to a flowchart shown in FIG. 3. The values of the control section 21 are initialized in Step S1 upon start, and the vehicle speed is calculated based on the output of the speed sensor 6 in Step S2. In Step S3, the throttle opening is calculated based on the output of the throttle opening sensor 7. In Step S4, it is judged on the basis of the calculated vehicle speed and throttle opening that the speed sensor 6 has failed if the throttle opening is greater than or equal to a predetermined value and if the state exists in which the speed is zero for a predetermined time period, or if the deceleration of the vehicle speed becomes greater than or equal to a predetermined value. Otherwise, it is judged that the speed sensor 6 has not failed.

If it is judged that the speed sensor 6 has failed, the processing returns to the start without controlling the air pump 12 nor the indicator 13, whereas if it is judged that the speed sensor 6 has not failed, the processing proceeds to Step S5. Steps S5 to S9 involve the controlling of the air pump 12. In Step S5, it is judged whether or not the differential gear lock switch 5 is turned on. If the switch 5 is turned off, the air pump 12 is turned off in Step S9, whereas if the switch 5 is turned on, the processing proceeds to Step S6. In Step S6, it is judged that the vehicle speed is greater than or equal to a set speed, or is less than the set speed. If the vehicle speed is less than the set speed, the air pump 12 is turned on in Step S8, whereas if the speed is greater than or equal to the set value, the processing proceeds to Step S7.

In Step S7, it is judged whether or not the air pump 12 is turned on. If the air pump 12 is turned on, the air pump 12 is kept turned on in Step S8, whereas if the air pump 12 is turned off, the air pump 12 is kept turned off in Step S9. Steps S10 to S14 involve the controlling of the indicator 13. In Step S10 it is judged whether or not the rear differential gear 3 is in the course of switching from the locked state to the unlocked state from the outputs of the lock detecting switch 4 and the differential gear lock switch 5. If the locked state is being switched to the unlocked state, the indicator 13 is caused to blink in Step S12, whereas if not, the processing proceeds to Step S11. In Step S11 whether or not the rear differential gear 3 is locked is judged. If the rear differential gear 3 is locked, the indicator 13 is turned on in Step S13, whereas if the rear differential gear 3 is unlocked, the indicator 13 is turned off in Step S14. The processing returns to the start after Steps S12 to S14.

While the mechanism for locking the rear differential gear 3 is driven air-hydraulically using the air pump 12 in the above embodiment, the mechanism may be driven oil-hydraulically using a hydraulic pump or electrically using a motor. Further, a sensor for counting the number of revolutions of an engine may be used in lieu of the throttle opening sensor 7 to judge that the speed sensor 6 has failed based on outputs of the speed sensor 6 and such sensor for counting the number of revolutions of the engine.

As described in the foregoing pages, the invention judges whether or not the speed sensor has failed, and prohibits the rear differential gear from being locked by the operation of the differential gear lock switch if the speed sensor has failed. Therefore, it is not likely that the rear differential gear will be locked when a vehicle is making a turn at speeds greater than or equal to a predetermined vehicle speed. As a result, damage to the rear differential gear lock mechanism or sharp understeer due to the locking of the rear differential gear can be prevented. Thus, a highly safe rear differential gear lock controller can be obtained.

What is claimed is:

1. A rear differential gear lock controller, comprising:
   means for driving a mechanism for locking a rear differential gear of a vehicle;
   instruction means for outputting a control signal to said driving means for locking said rear differential gear;
   a speed sensor for detecting a speed of said vehicle;
   first detecting means for detecting a locked state of said rear differential gear;
   second detecting means for detecting one of a throttle opening and a number of revolutions of an engine;
   judging means for judging a failure of said speed sensor when an output of said second detecting means is greater than or equal to a predetermined value and either said detected speed of said vehicle is zero for a predetermined time period, or a deceleration of said speed of said vehicle is greater than or equal to a predetermined value; and
   control means for allowing said rear differential gear to be locked by said driving means in accordance with an operation of said instruction means at a speed less than a predetermined vehicle speed, for prohibiting said rear differential gear from being locked at a speed greater than or equal to said predetermined vehicle speed, and for stopping the operation of controlling said driving means when said speed sensor fails.

2. A rear differential gear lock controller as claimed in claim 1, further comprising an indicator and indicator controlling means, wherein said indicator blinks on when said rear differential gear is in a course of switching between a locked state and an unlocked state.

3. A rear differential gear lock controller as claimed in claim 1, wherein said driving means comprises a pneumatic pump.

4. A rear differential gear lock controller according to claim 1, wherein said driving means comprises a hydraulic pump.

5. A rear differential gear lock controller according to claim 1, wherein said driving means comprises an electric motor.

* * * * *